US012443308B2

United States Patent
Shen et al.

(10) Patent No.: US 12,443,308 B2
(45) Date of Patent: Oct. 14, 2025

(54) SYSTEM AND METHOD FOR PARALLEL SENSING IN A TOUCH SENSOR

(71) Applicant: Synaptics Incorporated, San Jose, CA (US)

(72) Inventors: Guozhong Shen, Fremont, CA (US); Katayoun Goudarzi, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/756,833

(22) Filed: Jun. 27, 2024

(65) Prior Publication Data

US 2025/0004594 A1    Jan. 2, 2025

Related U.S. Application Data

(60) Provisional application No. 63/510,805, filed on Jun. 28, 2023.

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .... G06F 3/04166; G06F 3/044; G06F 3/0418; G06F 3/0443
See application file for complete search history.

(56) References Cited

U.S. PATENT DOCUMENTS

| | | | | |
|---|---|---|---|---|
| 2014/0375598 A1* | 12/2014 | Shen | ...................... | G06F 3/0446 345/174 |
| 2022/0050548 A1* | 2/2022 | Goudarzi | ............... | G01V 3/088 |
| 2022/0050551 A1* | 2/2022 | Hoch | .................... | G06F 3/0412 |
| 2022/0276761 A1* | 9/2022 | Kim | ..................... | G06F 3/04166 |
| 2023/0152922 A1* | 5/2023 | Jung | ..................... | G06F 3/0446 345/174 |

\* cited by examiner

*Primary Examiner* — Hong Zhou
(74) *Attorney, Agent, or Firm* — Leydig, Voit & Mayer, Ltd.

(57) ABSTRACT

An input device includes: a plurality of sensor electrodes disposed in a sensing region of the input device; and a processing system configured to operate a first subset of the plurality of sensor electrodes in a multi-frequency parallel transcapacitive sensing manner to obtain a first capacitive touch profile. Operating the first subset of the plurality of sensor electrodes in the multi-frequency parallel transcapacitive sensing manner to obtain the first capacitive touch profile includes: operating a first plurality of sensor electrodes of the first subset as transmitter electrodes, including driving the transmitter electrodes with sensing signals of two or more different frequencies; operating a second plurality of sensor electrodes of the first subset as receiver electrodes, including obtaining resulting signals via the receiver electrodes corresponding to the sensing signals; and obtaining the first capacitive touch profile based on the obtained resulting signals.

20 Claims, 10 Drawing Sheets

SYSTEM AND METHOD FOR PARALLEL SENSING IN A TOUCH SENSOR

CROSS-REFERENCE TO RELATED APPLICATION

The present application claims priority to U.S. Provisional Patent Application No. 63/510,805, filed Jun. 28, 2023, which is incorporated herein by reference in its entirety.

FIELD

This disclosure relates generally to the field of touch sensors, and specifically to systems and methods for multi-frequency trans-capacitive sensing.

BACKGROUND

Input devices, such as touch sensor devices and fingerprint sensors, are widely used in a variety of electronic systems. Touch sensor devices typically include a sensing region, often demarked by a surface, in which the touch sensor device determines the presence, location and/or motion of one or more input objects.

Touch sensor devices may be used to provide interfaces for electronic systems. For example, touch sensor devices are often used as input devices for larger computing systems (such as opaque touchpads and fingerprint readers integrated in, or peripheral to, notebook or desktop computers). Touch sensor devices are also often used in smaller computing systems (such as touchscreens integrated in cellular phones).

Touch sensors utilizing absolute-capacitance sensing may suffer from certain issues, such as causing touch-to-display interference, being sensitive to temperature drift, and requiring a large silicon area. Touch sensors utilizing transcapacitive sensing may also have certain issues, such as requiring multiple bursts to capture a single axis profile, requiring significant computational complexity, and causing touch-to-display interference.

SUMMARY

In an example embodiment, the present disclosure provides an input device. The input device includes: a plurality of sensor electrodes disposed in a sensing region of the input device; and a processing system configured to operate a first subset of the plurality of sensor electrodes in a multi-frequency parallel transcapacitive sensing manner to obtain a first capacitive touch profile. Operating the first subset of the plurality of sensor electrodes in the multi-frequency parallel transcapacitive sensing manner to obtain the first capacitive touch profile comprises: operating a first plurality of sensor electrodes of the first subset as transmitter electrodes, including driving the transmitter electrodes with sensing signals of two or more different frequencies; operating a second plurality of sensor electrodes of the first subset as receiver electrodes, including obtaining resulting signals via the receiver electrodes corresponding to the sensing signals; and obtaining the first capacitive touch profile based on the obtained resulting signals.

In a further embodiment, the first subset of the plurality of sensor electrodes corresponds to a first axis of the sensing region, and the first capacitive touch profile is a one-dimensional capacitive touch profile corresponding to the first axis.

In a further embodiment, the processing system is further configured to operate a second subset of the plurality of sensor electrodes in a multi-frequency parallel transcapacitive sensing manner so as to obtain a second capacitive touch profile.

In a further embodiment, the first subset of the plurality of sensor electrodes corresponds to a first axis of the sensing region, the second subset of the plurality of sensor electrodes corresponds to a second axis of the sensing region, the first capacitive touch profile is a one-dimensional capacitive touch profile corresponding to the first axis, and the second capacitive touch profile is a one-dimensional capacitive touch profile corresponding to the second axis.

In a further embodiment, the processing system is further configured to: perform LGM compensation on the first capacitive touch profile.

In a further embodiment, the processing system is further configured to: operate the plurality of sensor electrodes to obtain a two-dimensional capacitive image; and perform LGM compensation on the obtained two-dimensional capacitive image.

In a further embodiment, the processing system is further configured to: determine whether a receiver electrode is available for obtaining LGM compensation-related information.

In another example embodiment, the present disclosure provides a method for capacitive sensing. The method includes: operating, by a processing system of an input device, a first subset of a plurality of sensor electrodes disposed in a sensing region of the input device in a multi-frequency parallel transcapacitive sensing manner to obtain a first capacitive touch profile. Operating the first subset of the plurality of sensor electrodes in the multi-frequency parallel transcapacitive sensing manner to obtain the first capacitive touch profile includes: operating a first plurality of sensor electrodes of the first subset as transmitter electrodes, including driving the transmitter electrodes with sensing signals of two or more different frequencies; operating a second plurality of sensor electrodes of the first subset as receiver electrodes, including obtaining resulting signals via the receiver electrodes corresponding to the sensing signals; and obtaining the first capacitive touch profile based on the obtained resulting signals.

In yet another example embodiment, the present disclosure provides a non-transitory computer-readable medium having processor-executable instructions stored thereon for capacitive sensing. The processor-executable instructions, when executed, facilitate the following being performed by an input device: operating a first subset of a plurality of sensor electrodes disposed in a sensing region of the input device in a multi-frequency parallel transcapacitive sensing manner to obtain a first capacitive touch profile. Operating the first subset of the plurality of sensor electrodes in the multi-frequency parallel transcapacitive sensing manner to obtain the first capacitive touch profile includes: operating a first plurality of sensor electrodes of the first subset as transmitter electrodes, including driving the transmitter electrodes with sensing signals of two or more different frequencies; operating a second plurality of sensor electrodes of the first subset as receiver electrodes, including obtaining resulting signals via the receiver electrodes corresponding to the sensing signals; and obtaining the first capacitive touch profile based on the obtained resulting signals.

BRIEF DESCRIPTION OF THE DRAWINGS

So that the manner in which the above recited features of the instant disclosure can be understood in detail, a more particular description of the disclosure, briefly summarized above, may be had by reference to embodiments, some of which are illustrated in the appended drawings. It is to be noted, however, that the appended drawings illustrate only example embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is exemplary in nature and is not intended to limit the invention or the application and uses of the invention. Furthermore, there is no intention to be bound by any expressed or implied theory presented in the preceding field, background, summary, brief description of drawings, or the following detailed description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Example embodiments of the present disclosure provide systems and methods for performing touch sensing in a manner that avoids drawbacks discussed in the foregoing background, including by way of performing parallel transcapacitive touch sensing using multiple frequencies for the sensing signals. By utilizing the multiple frequencies, it may be possible to complete parallel transcapacitive touch sensing in fewer bursts, including certain implementations which may use only a single burst or two bursts to obtain a respective capacitive touch profile.

Additionally, example embodiments of the present disclosure provide for the capability to compensate for low-ground mass (LGM) signal losses when obtaining 1D capacitive touch profiles.

Figure 1:
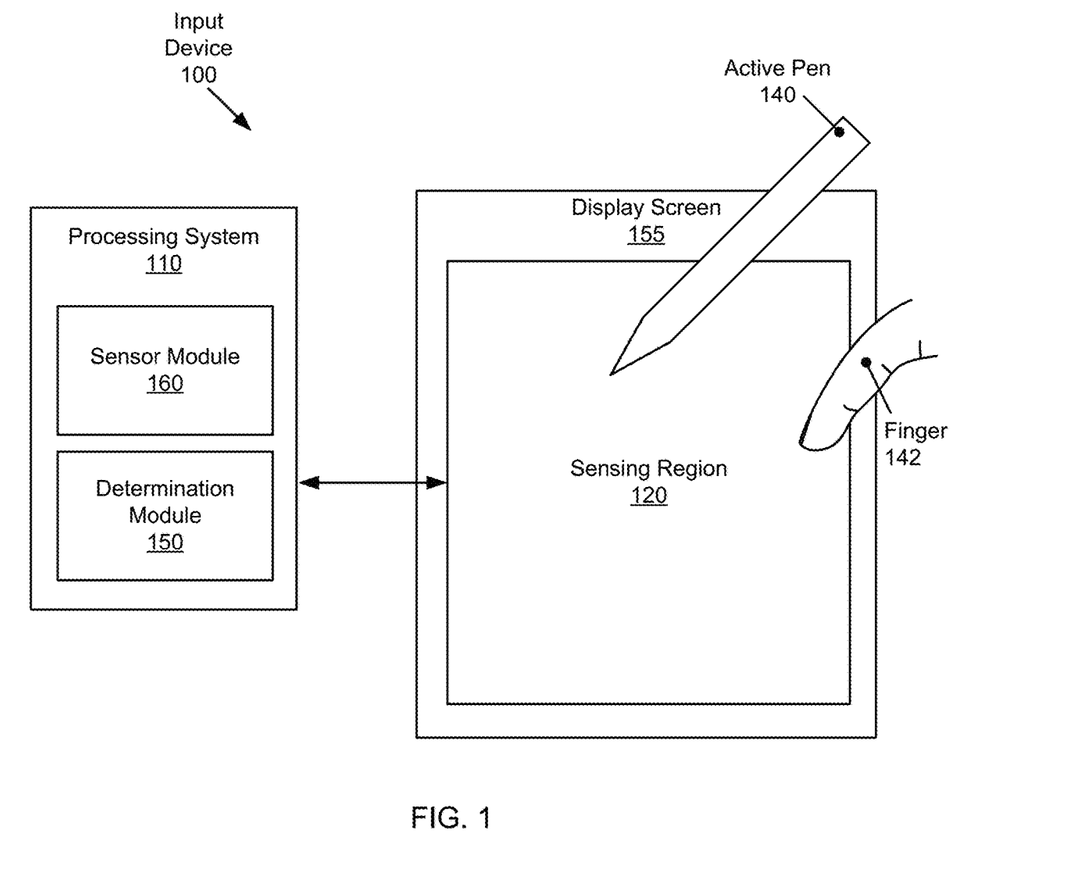
FIG. 1 illustrates a block diagram of an example input device environment.

FIG. 1 is a block diagram of an example input device environment in which example embodiments of the present disclosure may be applicable. The input device 100 may be configured to provide input to an electronic system. As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

In FIG. 1, the input device 100 is shown as a touch sensor device (e.g., "touchpad" or a "touch sensor device") configured to sense input provided by one or more input objects in a sensing region 120. Example input objects include styli, an active pen 140, and fingers 142. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region 120 encompasses any space above, around, in and/or near the input device 100 in which the input device 100 is able to detect user input (e.g., user input provided by one or more input objects). The sizes, shapes, and locations of particular sensing regions may vary from embodiment to embodiment.

The input device 100 may use any combination of sensor components and sensing technologies to detect user input in the sensing region 120. The input device 100 includes one or more sensing elements for detecting user input. The sensing elements may be capacitive.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground.

In some embodiments, transmitter sensor electrodes and receiver sensor electrodes may both be modulated. The transmitter electrodes may be modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

In FIG. 1, a processing system 110 is shown as part of the input device 100. The processing system 110 is configured to operate the hardware of the input device 100 to detect input in the sensing region 120. The processing system 110 includes parts of or all of one or more integrated circuits (ICs) and/or other circuitry components. For example, a processing system 110 for a mutual capacitance sensor device may include transmitter circuitry configured to transmit signals with transmitter sensor electrodes, and/or receiver circuitry configured to receive signals with receiver sensor electrodes. Further, a processing system 110 for an absolute capacitance sensor device may include driver circuitry configured to drive absolute capacitance signals onto sensor electrodes, and/or receiver circuitry configured to receive signals with those sensor electrodes. In one or more embodiments, a processing system 110 for a combined mutual and absolute capacitance sensor device may include any combination of the above described mutual and absolute capacitance circuitry. A processing system 110 may further include receiver circuitry configured to receive signals emitted by a different source, e.g., an active pen 140. The signals by the active pen 140 may be received by the receiver sensor electrodes, while transmit signals are not necessarily emitted by transmitter sensor electrodes.

In some embodiments, the processing system 110 also includes electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to the sensing element(s) of the input device 100, and one or more components elsewhere. For example, the input device 100 may be a peripheral coupled to a computing device, and the processing system 110 may include software configured to run on a central processing unit of the computing device and one or more ICs (perhaps with associated firmware) separate from the central processing unit. As another example, the input device 100 may be physically integrated in a mobile device, and the processing system 110 may include circuits and firmware that are part of a main processor of the mobile device. In some embodiments, the processing system 110 is dedicated to implementing the input device 100. In other embodiments, the processing system 110 also performs other functions, such as operating display screens 155, driving haptic actuators, etc.

The processing system 110 may be implemented as a set of modules that handle different functions of the processing system 110. Each module may include circuitry, firmware, software, or a combination thereof. In various embodiments, different combinations of modules may be used. For example, as shown in FIG. 1, the processing system 110 may include a determination module 150 and a sensor module 160. The determination module 150 may include functionality to determine when at least one input object is in a sensing region, signal to noise ratio, positional information of an input object, a gesture, an action to perform based on the gesture, a combination of gestures or other information, and/or other operations. For example, the determination module 150 may be implemented in the form of a controller (including, e.g., a microcontroller or microprocessor) and/or processing circuitry.

The sensor module 160 may include functionality to drive the sensing elements to transmit transmitter signals and receive the resulting signals. For example, the sensor module 160 may include sensory circuitry that is coupled to the sensing elements. The sensor module 160 may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The receiver module of the sensor module 160 may receive resulting signals from sensor electrodes in the electrode pattern using a capacitive sensing signal having a sensing frequency, e.g., generated by the transmitter module. The resulting signals may include desired signals, such as active pen data or signal components caused by an input object being in proximity to the electrode pattern, or undesired signals, such as noise or interference. As will be described in greater detail below, the sensor module 160 may perform one or more demodulation operations on the resulting signal.

Although FIG. 1 shows a determination module 150 and a sensor module 160, alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens 155, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

In some embodiments, the input device 100 includes a touch screen interface, and the sensing region 120 overlaps at least part of an active area of a display screen 155. For example, the input device 100 may include substantially transparent sensor electrodes overlaying the display screen and provide a touch screen interface for the associated electronic system. The display screen may be any type of dynamic display capable of displaying a visual interface to a user and may include any type of light emitting diode (LED), organic LED (OLED), cathode ray tube (CRT), liquid crystal display (LCD), plasma, electroluminescence (EL), or other display technology. The input device 100 and the display screen 155 may share physical elements. For example, some embodiments may utilize some of the same electrical components for displaying and sensing. In various embodiments, one or more display electrodes of a display device may be configured for both display updating and input sensing. As another example, the display screen 155 may be operated in part or in total by the processing system 110.

FIG. 1 shows merely one example configuration of components, and it will be appreciated that other configurations may be used without departing from the scope of the disclosure. For example, various components may be combined to create a single component. As another example, the functionality performed by a single component may be performed by two or more components. Further, while a configuration for touch sensing is described, other parameters such as force may be sensed.

Figure 2:
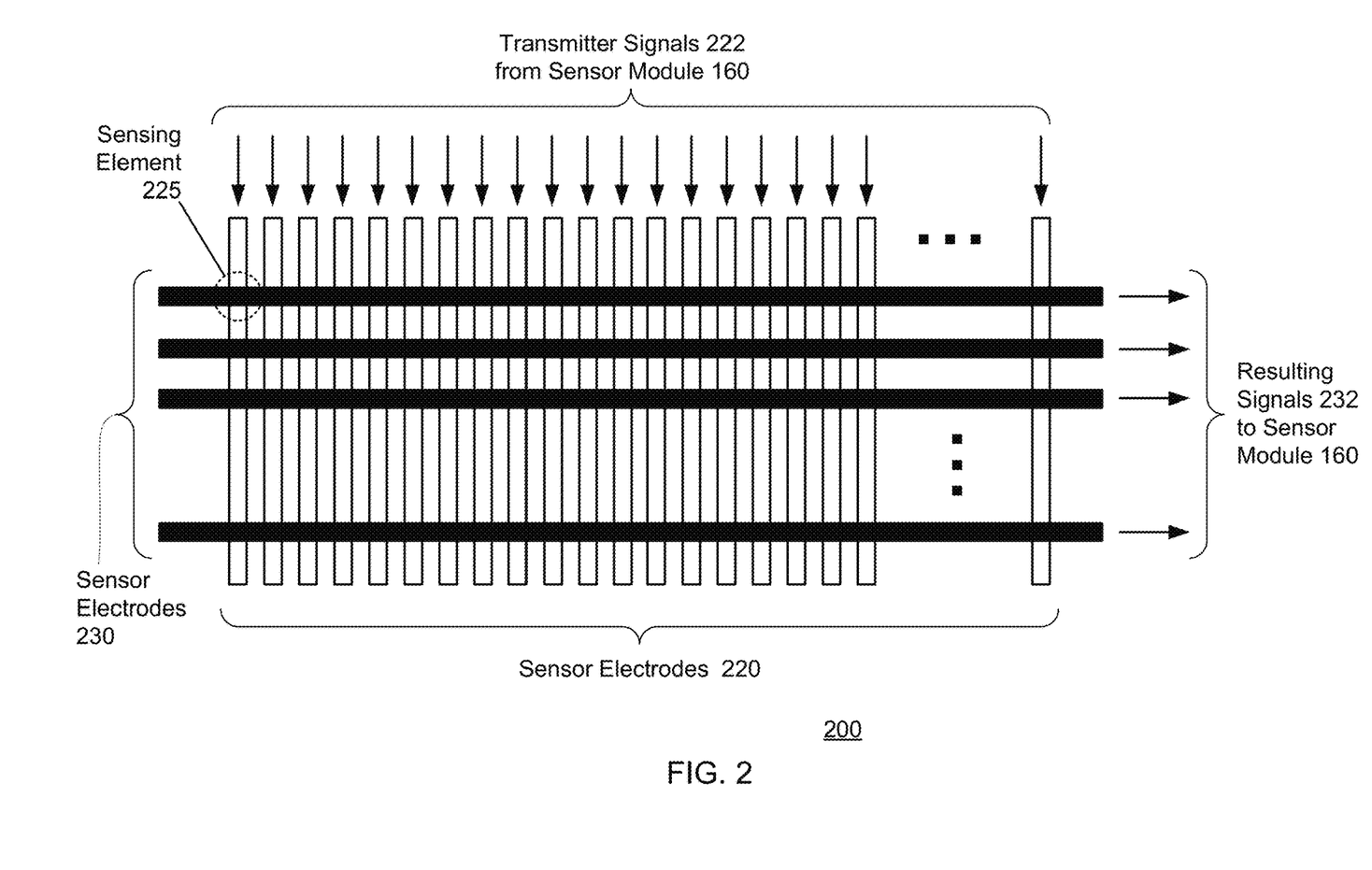
FIG. 2 illustrates an example sensor array.

FIG. 2 shows an example sensor array 200. The sensor array 200 is based on an arrangement of sensor electrodes in a sensing region (e.g., sensing region 120 as shown in FIG. 1). Transmitter (Tx) electrodes 220 and receiver (Rx) electrodes 230 may be disposed in the sensing region. In the example of FIG. 2, the Tx electrodes 220 are elongated rectangular structures arranged in columns, whereas the Rx electrodes 230 are elongated rectangular structures arranged in rows. Generally, it will be appreciated that Tx and Rx electrodes of various shapes and arrangements may be used, and example embodiments of the present disclosure are not limited to the bars-and-stripes configuration shown in FIG. 2.

In one or more embodiments, the Tx electrodes 220 and the Rx electrodes 230, together, implement two-dimensional mutual capacitance or transcapacitance sensing. At the intersection of a Tx electrode 220 and an Rx electrode 230, a localized capacitive coupling is formed between a portion of a respective Tx electrode 220 and a portion of a respective Rx electrode 230. The region of this localized capacitive coupling may be termed a "capacitive pixel," or also referred to herein as a sensing element 225. A transcapacitance Ct is associated with the sensing element 225. When an input object approaches the sensing element 225, the transcapacitance Ct may change by an amount ΔCt. A presence or absence of the input object may thus be detected by monitoring ΔCt. ΔCt may be measured by driving a transmitter signal 222 onto the Tx electrode 220 and receiving a resulting signal 232 from the Rx electrode 230. The resulting signal is a function of the transmitter signal and ΔCt due to the presence or absence of an input object. ΔCt measurements may be obtained for multiple sensing elements to generate a capacitive image, e.g., spanning the entire sensing region 120.

It will be appreciated that although FIG. 2 shows the sensor electrodes 220 being operated as Tx electrodes and the sensor electrodes 230 being operated as Rx electrodes, each of the sensor electrodes is not limited to such operation, as a processing system may operate each sensor electrode as a Tx electrode or an Rx electrode (for transcapacitive sensing) or as an absolute capacitance electrode. In some embodiments, the vertical sensor electrodes 220 may include both Tx and Rx electrodes for one-dimensional parallel transcapacitance sensing which is used to obtain a one-dimensional capacitive touch profile, and the horizontal sensor electrodes 230 may similarly include both Tx and Rx electrodes for one-dimensional parallel transcapacitance sensing to obtain another one-dimensional capacitive touch profile.

It will be appreciated that the term "parallel" as used herein with respect to sensor electrodes does not strictly require the sensor electrodes to be exactly parallel with one another. Rather, the term "parallel" as used herein with reference to sensor electrodes refers to sensor electrodes which are capable of being operated in a parallel transcapacitive sensing manner wherein an Rx electrode does not have to intersect with any Tx electrode (as opposed to a conventional manner of 2D capacitive sensing which has capacitive pixels at respective Tx/Rx intersections).

Figure 3A:
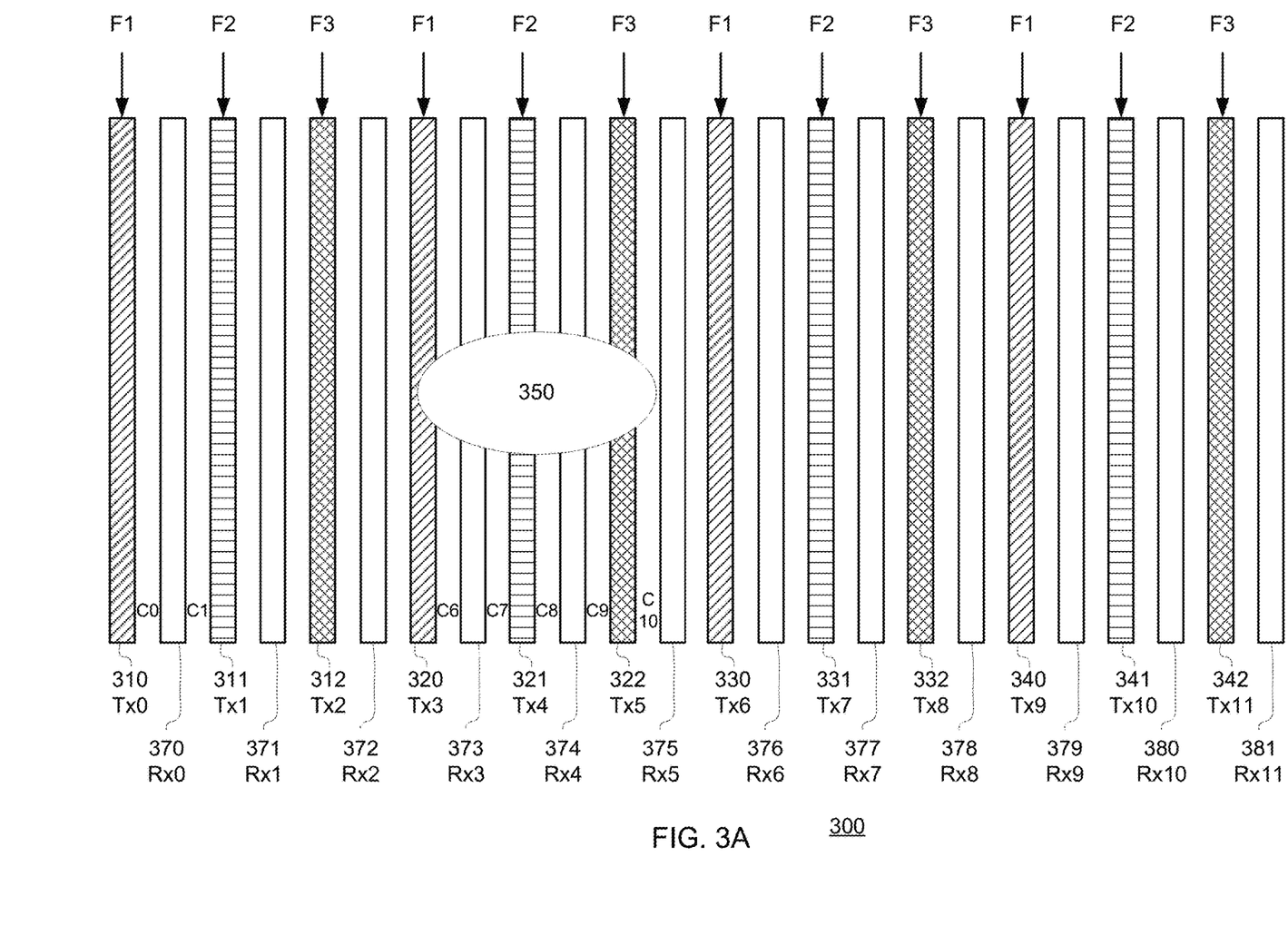
FIG. 3A illustrates an example of a subset of sensor electrodes of a sensor array being driven in a multi-frequency parallel transcapacitive sensing manner in a sensing burst.

FIG. 3A illustrates an example of a subset of sensor electrodes 300 of a sensor array being operated in a multi-frequency parallel transcapacitive sensing manner in a sensing burst according to an example embodiment of the disclosure. Particularly, in this example, 24 vertical sensor electrodes are operated in a parallel transcapacitive sensing manner, whereby certain sensor electrodes 310, 311, 312, 320, 321, 322, 330, 331, 332, 340, 341, 342 are operated as Tx electrodes Tx0-Tx11 driven (by a processing system) with a repeating pattern of sensing signals corresponding to multiple frequencies (a first frequency F1, a second frequency F2, and a third frequency F3), wherein each sensing signal has the same polarity. The repeating pattern depicted in FIG. 3A includes the sequence F1, F2, F3 being repeated four times over the twelve Tx electrodes. While the Tx electrodes are being driven with respective multi-frequency sensing signals, the other sensor electrodes 370-381 are operated as Rx electrodes Rx0-Rx11, and resulting signals are obtained (by the processing system) via the Rx electrodes, wherein the resulting signals correspond to the sensing signals driven onto the Tx electrodes.

Since the processing system obtains resulting signals containing multiple frequencies from each receiver electrode, the processing system is able to differentiate between multiple capacitances being simultaneously measured at respective receiver electrodes (e.g., the processing system is able to differentiate between a first capacitance C0 between Tx0 and Rx0 corresponding to a sensing signal at frequency F1 and a second capacitance C1 between Rx0 and Tx1 corresponding to a sensing signal at frequency F2). And measurements at receiver electrodes 373, 374 and 375 (corresponding to detected capacitances C6, C7, C8, C9 and C10) indicate the presence of object 350 in the sensing region of the touch sensor. Thus, by using multiple frequencies in the manner depicted in FIG. 3A, it may be possible for a whole parallel transcapacitive touch profile for one axis to be obtainable in a single sensing burst (in the depicted example, the 1D capacitive touch profile would indicate that object 350 is on both sides of Rx3 and Rx4 and on the left side of Rx5, and that no object is present elsewhere along this axis). However, it will be appreciated that even if it is possible to obtain the whole parallel transcapacitive touch profile for one axis in a single sensing burst, there may still be certain advantages to performing multiple bursts (such as two bursts).

It will be appreciated that this example is merely illustrative, and that the principles depicted in FIG. 3A are applicable to other configurations and manners of operation, including, for example, sensor arrays having a different number of sensor electrodes, sensor arrays having different electrode shapes, operation with more or less different frequencies or a different sequence of frequencies/polarities, operation with a different distribution of Tx and Rx electrodes, etc. It will further be appreciated that the principles depicted in FIG. 3A are also applicable to obtaining a capacitive touch profile by performing multi-frequency parallel transcapacitive sensing using horizontal sensor electrodes, such as horizontal sensor electrodes 230 illustrated in FIG. 2 (as opposed to vertical sensor electrodes as illustrated in FIG. 3A).

It will be appreciated that using the same polarity for the sensing signals of each respective frequency enables the processing system to obtain LGM signal loss information which allows for compensating for such LGM signal loss when generating a 1D capacitive touch profile corresponding to the electrodes shown in FIG. 3A, thereby avoiding artifacts in the 1D capacitive touch profile attributable to the existence of LGM conditions (which become more and more of an issue as touch input devices, such as touchscreen displays, get thinner and thinner).

Figure 3B:
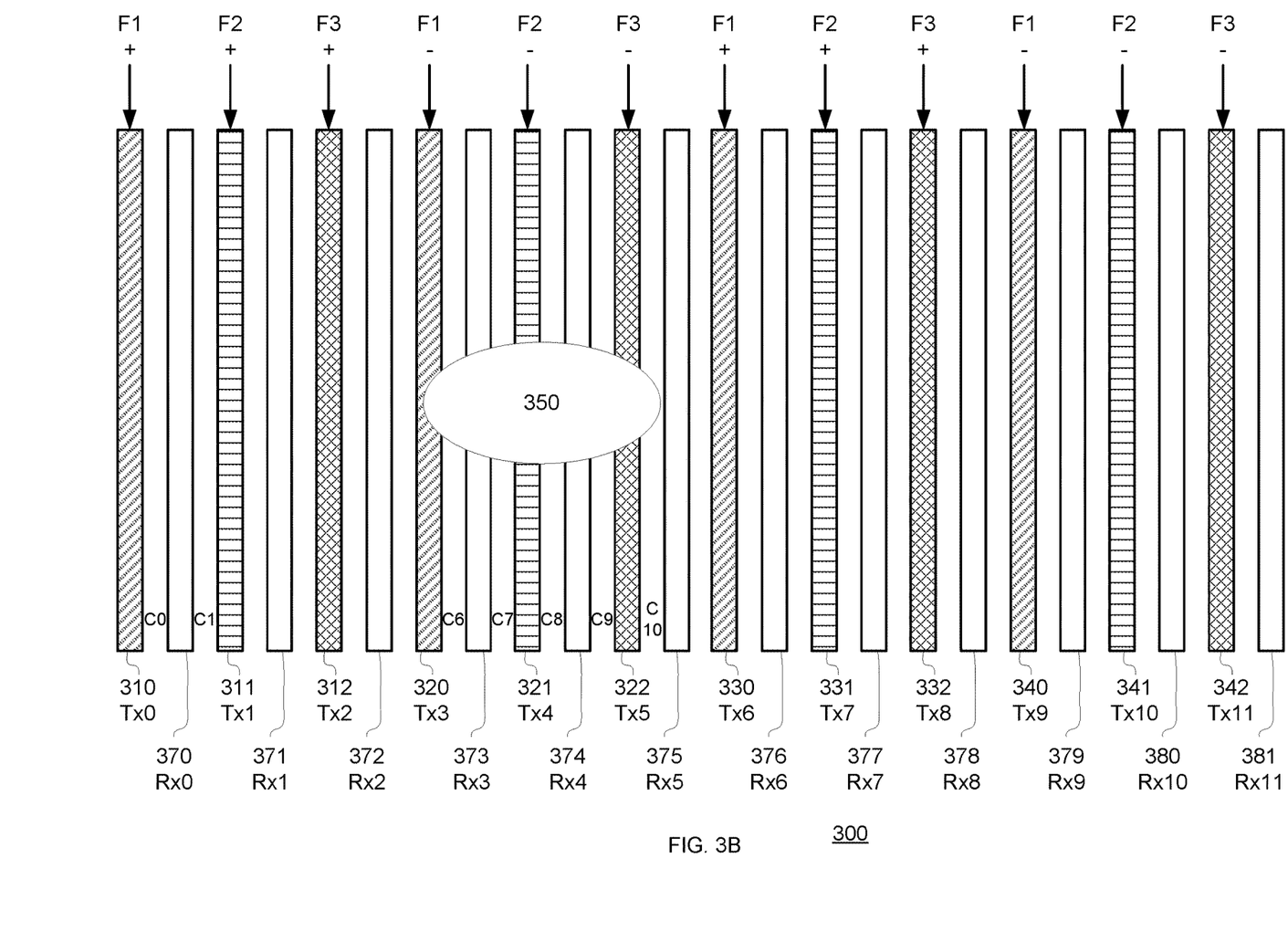
FIG. 3B illustrates another example of a subset of sensor electrodes of a sensor array being driven in a multi-frequency parallel transcapacitive sensing manner in a sensing burst.

In a further example embodiment, to reduce touch-to-display interference, different polarities may be used for the sensing signals at each respective frequency. FIG. 3B illustrates another example of a subset of sensor electrodes 300 of a sensor array being operated in a multi-frequency parallel transcapacitive sensing manner in a sensing burst according to an example embodiment of the disclosure. FIG. 3B is similar to FIG. 3A, except that instead of all of the Tx electrodes at each frequency having the same polarity, different polarities ("+" and "−") are utilized such that the repeating pattern depicted in FIG. 3B includes the sequence F1+, F2+, F3+, F1−, F2−, F3− being repeated twice over the twelve Tx electrodes.

In addition to the example situation depicted in FIGS. 3A-3B (single touch event where a single finger is present in the sensing region), there are also other situations which may be encountered by the input device, including a smaller or larger single finger being present or various possibilities of multiple fingers being present. As will be discussed below, FIGS. 4-7B illustrate some of these example situations.

Figure 4:
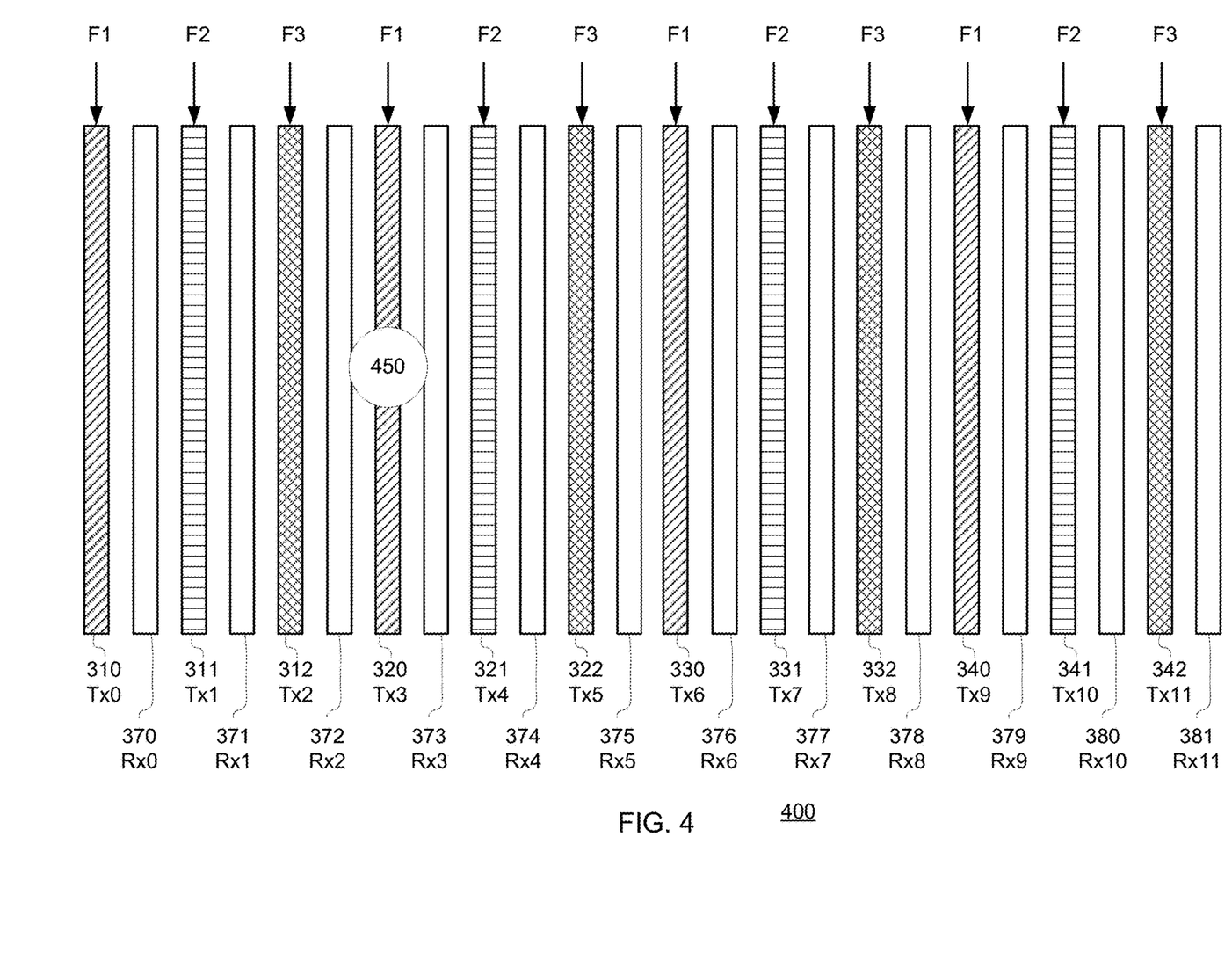
FIG. 4 illustrates an example of a sensing burst being performed for a single small finger touch event.

FIG. 4 illustrates an example 400 of a sensing burst being performed for a single small finger touch event. In this example, input object 450 is a finger which only covers two pitches, and as such, LGM conditions generally would not affect the capability of a touch sensor to obtain an accurate presence, location and/or movement reading with respect to a small finger touch such as shown in FIG. 4. Accordingly, in the situation shown in FIG. 4, an LGM compensation process may be skipped.

Figure 5A:
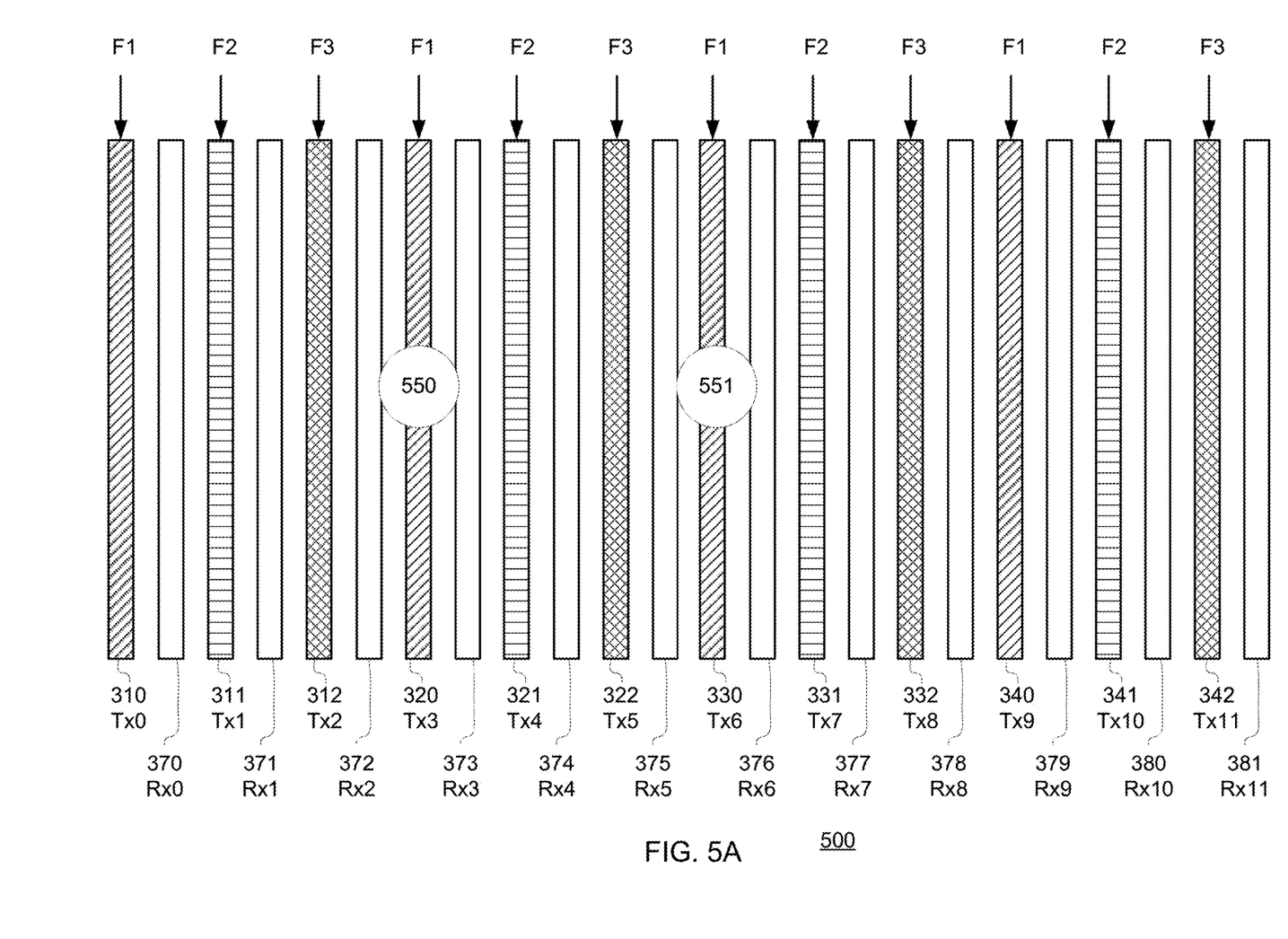
FIGS. 5A-5B illustrate an example of multiple sensing bursts being performed for a multiple small finger touch event.
Figure 5B:
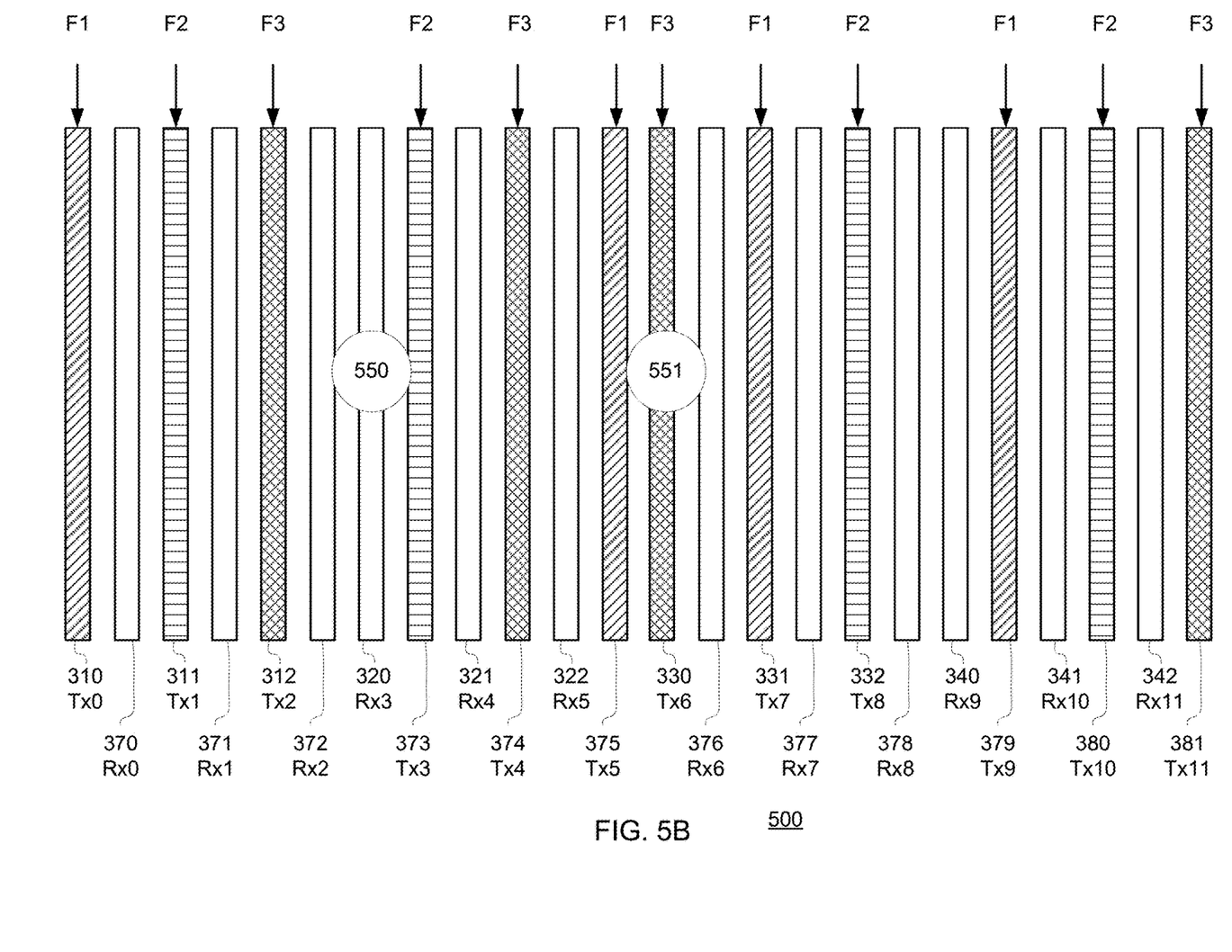

FIGS. 5A-5B illustrate an example 500 of multiple sensing bursts being performed for a multiple small finger touch event. In most cases of multiple finger touch events, it would be sufficient to perform a single burst to detect the respective locations of the multiple fingers in the sensing region, but there is an edge case as shown in FIG. 5A where a first small finger 550 contacts a Tx electrode at a certain frequency with one polarity and a second small finger 551 contacts another TX electrode at the same frequency with opposite polarity. In this edge case, a bridging effect between the two fingers of a respective user (due to the two fingers being electrically connected to one another via the user's hand and/or body and providing an electrical pathway between the two fingers, regardless of whether the two fingers are from the same hand or different hands) in combination with the locations of the fingers corresponding to the same-frequency sensing signal at opposite polarities may cause the sensing signals to cancel each other out, resulting in the two fingers not being properly detected in the burst configuration shown in FIG. 5A. As such, a second sensing burst may be performed.

FIG. 5B illustrates an example of a second sensing burst having a different burst configuration with respect to the distribution of Rx and Tx electrodes and the allocation of sensing signals to the respective electrodes. In this example of FIG. 5B, for the second burst, the first six sensor electrodes 310-312, 370-372 are operated the same way as in FIG. 5A, but the next six sensor electrodes 320-322, 373-375 have their roles reversed, with sensor electrodes 320-322 now being operated as Rx electrodes Rx3-Rx5 and sensor electrodes 373-375 being operated as Tx electrodes Tx3-Tx5. Further, the order of frequencies is changed to have sensing signals at F2−, F3− and F1− driven onto Tx3, Tx4 and Tx5, respectively. The next twelve sensor electrodes 330-332, 340-342, 376-381 are also operated differently relative to FIG. 5A as shown in FIG. 5B. As can be seen from the manner of operation depicted in FIG. 5B, the situation that arises in FIG. 5A is no longer an issue, such that the locations of the first finger 550 and the second finger 551 are properly detectable via the second sensing burst shown in FIG. 5B.

One or more further sensing bursts may also be performed in certain embodiments, and in the further sensing burst(s), additional changes can be made as to which sensor electrodes are operated as Tx and Rx electrodes and the distribution of the sensing signal frequencies and polarities. For example, in the first burst shown in FIG. 5A, the 24 electrodes were configured with the pattern Tx0(F1+), Rx0, Tx1(F2+), Rx1, Tx2(F3+), Rx2, Tx3(F1−), Rx3, Tx4(F2−), Rx4, Tx5(F3−), Rx5, Tx6(F1+), Rx6, Tx7(F2+), Rx7, Tx8 (F3+), Rx8, Tx9(F1−), Rx9, Tx10(F2−), Rx10, Tx11(F3−), Rx11; in the second burst shown in FIG. 5B, the 24 electrodes were configured such that the Tx/Rx assignments are switched every six electrodes and the frequency sequence is rotated every six electrodes such that the second burst has the pattern Tx0(F1+), Rx0, Tx1(F2+), Rx1, Tx2 (F3+), Rx2, Rx3, Tx3(F2−), Rx4, Tx4(F3−), Rx5, Tx5(F1−), Tx6(F3+), Rx6, Tx7(F1+), Rx7, Tx8(F2+), Rx8, Rx9, Tx9 (F1−), Rx10, Tx10(F2−), Rx11, Tx11(F3−); and in the one or more further bursts, one or more patterns may be used which are different from the patterns of FIGS. 5A-5B.

It will be appreciated that, as discussed above with respect to FIG. 3A, the pattern used in FIG. 5A is merely an illustrative example, and further that the pattern used in FIG. 5B is also merely an illustrative example. The principles discussed herein are applicable to other configurations and manners of operation, including, for example, sensor arrays having a different number of sensor electrodes, sensor arrays having different electrode shapes, operation with more or less different frequencies or a different sequence of frequencies/polarities, operation with a different distribution of Tx and Rx electrodes, etc.

Figure 6A:
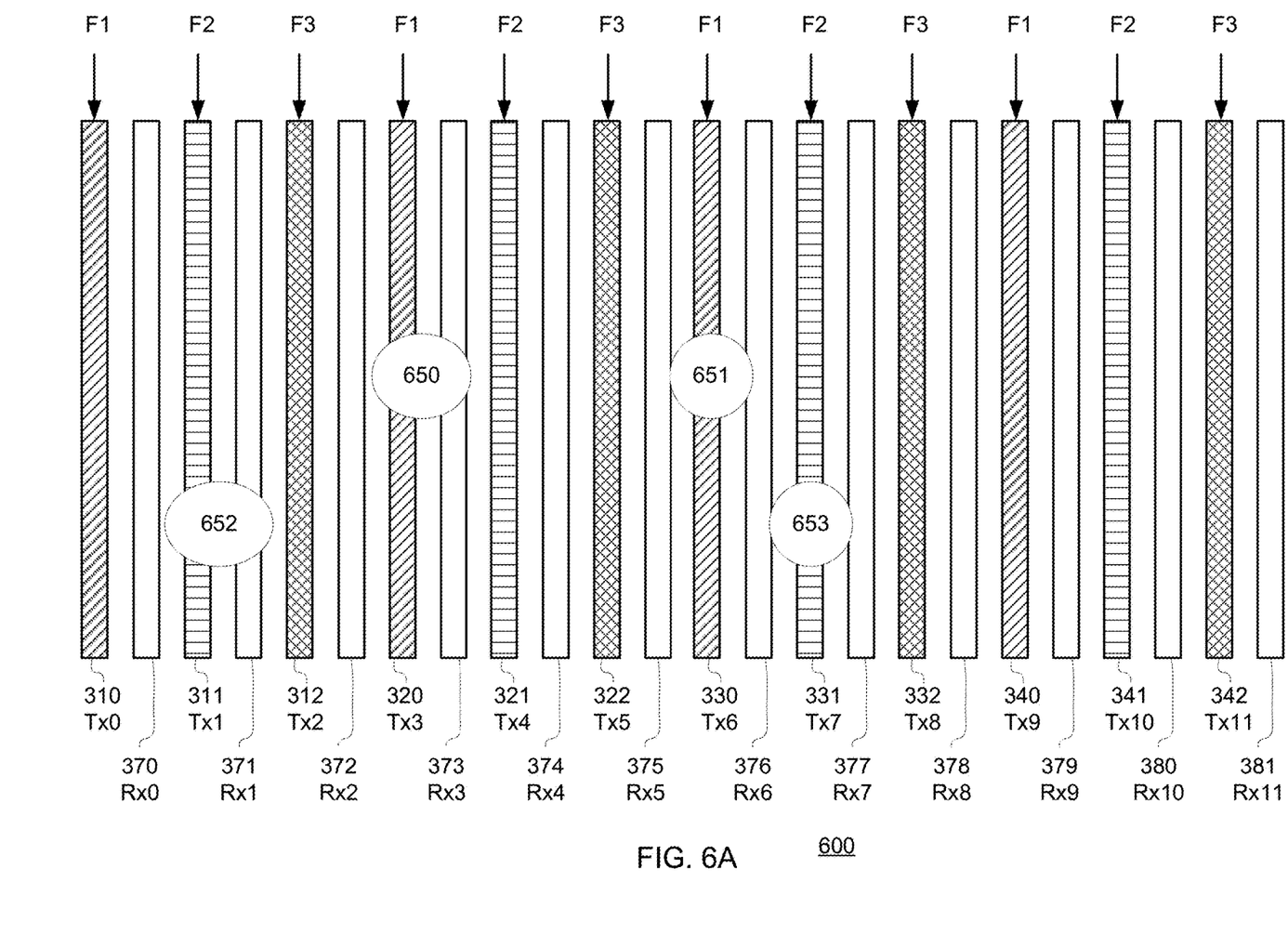
FIGS. 6A-6B illustrate another example of multiple sensing bursts being performed for a multiple small finger touch event.
Figure 6B:
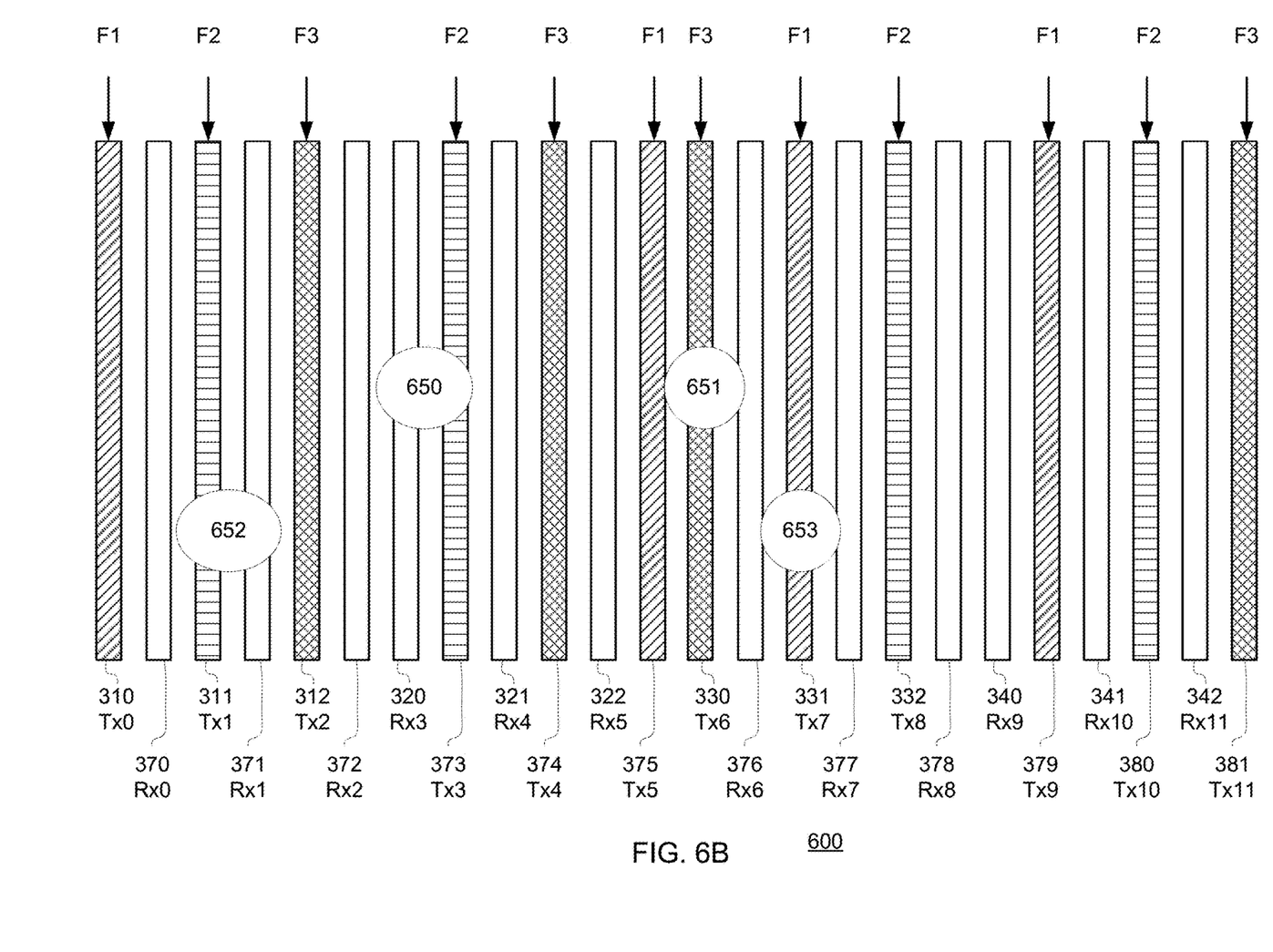

FIGS. 6A-6B illustrate another example 600 of multiple sensing bursts being performed for a multiple small finger touch event. It will be appreciated that, in view of the positions of small fingers 650 and 651 over respective transmitter electrodes being driven with sensing signals of the same frequency and opposite polarities, two bursts may be performed as shown in FIGS. 6A-6B, respectively, and based on the two bursts, the locations of all four fingers 650, 651, 652, 653 may be determined in the 1D capacitive touch profile provided by the sensor electrodes shown in FIGS. 6A-6B being operated in a parallel transcapacitive sensing manner.

Figure 7:
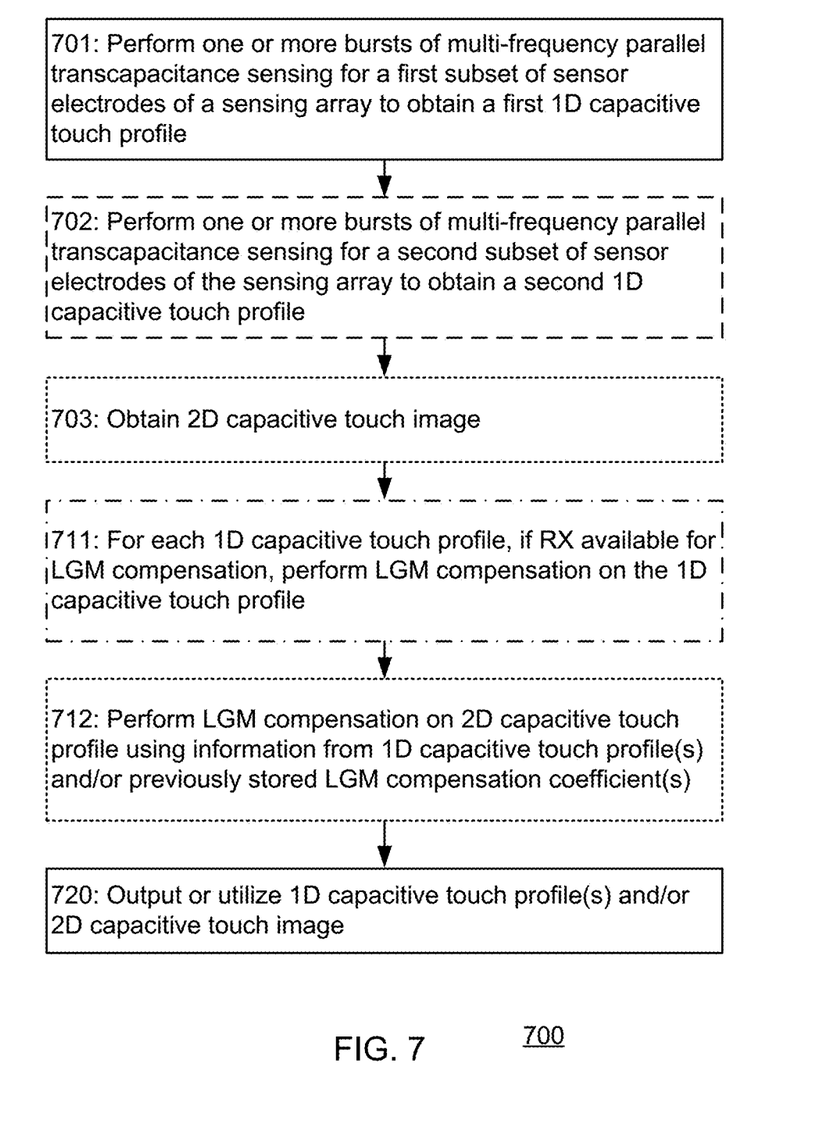
FIG. 7 illustrates an example of a process for capacitive sensing.

FIG. 7 illustrates an example of a process for capacitive sensing by an input device. As will be discussed below in more detail, at stages 701, 702 and 703, one or more respective 1D capacitive touch profile(s) and/or a 2D capacitive touch image may be obtained by the input device. It will be appreciated that stages 701-703 may be performed in any order and one or more of these stages 701-703 may be skipped in certain embodiments, as there are various use cases for obtaining a single 1D capacitive touch profile, obtaining multiple 1D capacitive touch profiles, obtaining a 2D capacitive touch image, or a combination thereof. Further, at stage 720, the obtained 1D capacitive touch profile(s) and/or the obtained 2D capacitive touch image, and/or LGM-compensated version(s) thereof, may be output or utilized by the input device for various purposes.

At stage 701, a processing system of the input device performs one or more sensing bursts of multi-frequency parallel transcapacitance sensing for a first subset of sensor electrodes of a sensing array of the input device to obtain a first 1D capacitive touch profile—e.g., a first 1D capacitive touch profile corresponding to a first axis is obtained in the manner discussed above in connection with FIGS. 3A-6B. In one example embodiment, a single burst is performed. In another example embodiment, two sensing bursts are performed. In yet another example embodiment, a first sensing burst is performed, followed by a determination of whether a second sensing burst is to be performed, and based on a determination that the second sensing burst is to be performed, the second sensing burst is performed. In further example embodiments, more than two sensing bursts may also be performed. As a result of stage 701, a first 1D capacitive touch profile is obtained, for example, corresponding to a first axis of a sensing region of the input device.

At stage 702, the processing system of the input device performs one or more sensing bursts of multi-frequency parallel transcapacitance sensing for a second subset of sensor electrodes of a sensing array of the input device to obtain a second 1D capacitive touch profile. For example, if the first 1D capacitive touch profile corresponds to a first subset of vertical electrodes (such as sensor electrodes 220 depicted in FIG. 2), the second 1D capacitive touch profile may correspond to a second subset of horizontal electrodes (such as sensor electrodes 230 depicted in FIG. 2), whereby the second 1D capacitive touch profile corresponds to a different axis of the sensing region of the input device relative to the first 1D capacitive touch profile. The manner of performing multi-frequency parallel transcapacitive sensing may be similar to the discussion above for stage 701 (and FIGS. 3A-6B), and one or two (or more) sensing bursts may be performed as discussed above.

At stage 703, a 2D capacitive touch image may also be obtained by the processing system via the sensor electrodes, for example, in the manner depicted in FIG. 2 whereby sensor electrodes 230 are operated as Rx electrodes and sensor electrodes 220 are operated as Tx electrodes, with capacitive sensing elements/pixels 225 at each respective intersection between a respective Rx electrode and a respective Tx electrode.

At stage 711, for each of the 1D capacitive touch profile(s) obtained at stages 701 and/or 702, LGM compensation may be performed for the 1D capacitive touch profile if there is an appropriate RX available that enables performance of LGM compensation. For example, in the situation shown in FIG. 3A, receiver electrode Rx3 is shielded from transmitter electrode Tx5 by electrodes Tx4 and Rx4 therebetween, but there is a bridging effect due to the presence of finger 350. Thus, the presence of the relatively large finger 350, which causes an LGM effect in the 1D capacitive touch profile obtained via the configuration shown in FIG. 3A, provides LGM signal loss-related information (obtained via Rx3) through the bridging effect, and such LGM signal loss-related information is used by the processing system to perform LGM compensation on the 1D capacitive touch profile.

It will be appreciated, however, that in some situations, such as the situation shown and discussed above in connection with FIG. 4, there is no appropriate RX available through which LGM signal loss-information may be obtained through parallel transcapacitive sensing, as there is no bridging effect provided by finger 450 that spans a transmitter electrode and a receiver electrode that is shielded from the transmitter electrode. It will further be appreciated that LGM effects may be less of an issue in such situations in any event.

At stage 712, LGM compensation may be performed on the 2D capacitive touch image obtained at stage 703. If LGM signal loss-related information is available from the 1D capacitive touch profile(s) obtained at stages 701 and/or 702 (such as in the situation of FIG. 3A), then such LGM signal loss-related information may be used in performing the LGM compensation on the 2D capacitive touch image. On the other hand, if LGM signal loss-related information is not available from the 1D capacitive touch profile(s) obtained at stages 701 and/or 702 (such as in the situation of FIG. 4), then previously stored LGM compensation coefficient(s) may be used in performing the LGM compensation on the 2D capacitive touch image.

Alternatively, LGM signal loss-related information may be obtained in other manners as well, for example, utilizing self-capacitance 1D capacitive touch profile(s), and the LGM compensation on the 2D capacitive touch image may utilize the signal loss-related information obtained from the self-capacitance 1D capacitive touch profile(s) instead of the LGM signal loss-related information from the 1D capacitive touch profile(s) obtained at stages 701 and/or 702 and/or instead of the previously stored LGM compensation coefficient(s).

At stage 720, the processing system may output or otherwise utilize the obtained 1D capacitive touch profile(s) and/or the 2D capacitive touch image, and/or the LGM-compensated versions thereof, for various purposes, including determining presence, location and/or motion of one or more input objects. Such presence, location and/or motion information may further be utilized by the processing system or a device or application in communication with the processing system for control of the device or application.

In view of the foregoing figures and description, it will be appreciated that example embodiments of the present disclosure provide systems and methods for performing parallel transcapacitive touch sensing using multiple frequencies for the sensing signals. The utilization of this multi-frequency parallel transcapacitive sensing approach for obtaining 1D capacitive touch profiles may provide for advantages over absolute capacitance sensing approaches as well as over single-frequency parallel transcapacitive sensing approaches, including with respect to less touch-to-display interference, less sensitivity to temperature drift, more efficient usage of silicon space, and/or shorter sensing time. The multi-frequency parallel transcapacitive sensing approach according to example embodiments discussed herein is further capable of providing relatively more information per sensing burst, and is further usable for providing LGM compensation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
  a plurality of sensor electrodes disposed in a sensing region of the input device; and
  a processing system configured to operate a first subset of the plurality of sensor electrodes in a multi-frequency parallel transcapacitive sensing manner to obtain a first capacitive touch profile, wherein operating the first subset of the plurality of sensor electrodes in the multi-frequency parallel transcapacitive sensing manner to obtain the first capacitive touch profile comprises:
    operating a first plurality of sensor electrodes of the first subset as transmitter electrodes, including driving the transmitter electrodes with sensing signals of two or more different frequencies;
    operating a second plurality of sensor electrodes of the first subset as receiver electrodes, including obtaining resulting signals via the receiver electrodes corresponding to the sensing signals; and
    obtaining the first capacitive touch profile based on the obtained resulting signals;
  wherein the processing system is further configured to:
    obtain low ground mass (LGM) compensation-related information via a first receiver electrode in case that an input object disposed in the sensing region provides a bridging effect from a first transmitter electrode corresponding to a first frequency to the first receiver electrode, wherein a second transmitter electrode corresponding to a second frequency and a second receiver electrode are disposed between the first transmitter electrode and the first receiver electrode; and
    perform LGM compensation on the first capacitive touch profile based on the obtained LGM compensation-related information.

2. The input device according to claim 1, wherein the first subset of the plurality of sensor electrodes corresponds to a first axis of the sensing region, and wherein the first capacitive touch profile is a one-dimensional capacitive touch profile corresponding to the first axis.

3. The input device according to claim 1, wherein the processing system is further configured to operate a second subset of the plurality of sensor electrodes in a multi-frequency parallel transcapacitive sensing manner so as to obtain a second capacitive touch profile.

4. The input device according to claim 3, wherein the first subset of the plurality of sensor electrodes corresponds to a first axis of the sensing region, wherein the second subset of the plurality of sensor electrodes corresponds to a second axis of the sensing region, wherein the first capacitive touch profile is a one-dimensional capacitive touch profile corresponding to the first axis, and wherein the second capacitive touch profile is a one-dimensional capacitive touch profile corresponding to the second axis.

5. The input device according to claim 1, wherein the processing system is further configured to:
operate the plurality of sensor electrodes to obtain a two-dimensional capacitive image; and
perform LGM compensation on the obtained two-dimensional capacitive image.

6. The input device according to claim 5, wherein performing LGM compensation on the obtained two-dimensional capacitive image utilizes the obtained LGM compensation-related information.

7. The input device according to claim 5, wherein performing LGM compensation on the obtained two-dimensional capacitive image utilizes previously stored LGM compensation-related information.

8. A method for capacitive sensing, comprising:
operating, by a processing system of an input device, a first subset of a plurality of sensor electrodes disposed in a sensing region of the input device in a multi-frequency parallel transcapacitive sensing manner to obtain a first capacitive touch profile;
wherein operating the first subset of the plurality of sensor electrodes in the multi-frequency parallel transcapacitive sensing manner to obtain the first capacitive touch profile comprises:
operating a first plurality of sensor electrodes of the first subset as transmitter electrodes, including driving the transmitter electrodes with sensing signals of two or more different frequencies;
operating a second plurality of sensor electrodes of the first subset as receiver electrodes, including obtaining resulting signals via the receiver electrodes corresponding to the sensing signals; and
obtaining the first capacitive touch profile based on the obtained resulting signals;
wherein the method further comprises:
obtaining, by the processing system, low ground mass (LGM) compensation-related information via a first receiver electrode in case that an input object disposed in the sensing region provides a bridging effect from a first transmitter electrode corresponding to a first frequency to the first receiver electrode, wherein a second transmitter electrode corresponding to a second frequency and a second receiver electrode are disposed between the first transmitter electrode and the first receiver electrode; and
performing, by the processing system, LGM compensation on the first capacitive touch profile based on the obtained LGM compensation-related information.

9. The method according to claim 8, wherein the first subset of the plurality of sensor electrodes corresponds to a first axis of the sensing region, and wherein the first capacitive touch profile is a one-dimensional capacitive touch profile corresponding to the first axis.

10. The method according to claim 8, wherein the processing system is further configured to operate a second subset of the plurality of sensor electrodes in a multi-frequency parallel transcapacitive sensing manner so as to obtain a second capacitive touch profile.

11. The method according to claim 10, wherein the first subset of the plurality of sensor electrodes corresponds to a first axis of the sensing region, wherein the second subset of the plurality of sensor electrodes corresponds to a second axis of the sensing region, wherein the first capacitive touch profile is a one-dimensional capacitive touch profile corresponding to the first axis, and wherein the second capacitive touch profile is a one-dimensional capacitive touch profile corresponding to the second axis.

12. The method according to claim 8, wherein the method further comprises:
operating the plurality of sensor electrodes to obtain a two-dimensional capacitive image; and
performing LGM compensation on the obtained two-dimensional capacitive image.

13. The method according to claim 12, wherein performing LGM compensation on the obtained two-dimensional capacitive image utilizes previously stored LGM compensation-related information.

14. A non-transitory computer-readable medium having processor-executable instructions stored thereon for capacitive sensing, wherein the processor-executable instructions, when executed, facilitate the following being performed by an input device:
operating a first subset of a plurality of sensor electrodes disposed in a sensing region of the input device in a multi-frequency parallel transcapacitive sensing manner to obtain a first capacitive touch profile;
wherein operating the first subset of the plurality of sensor electrodes in the multi-frequency parallel transcapacitive sensing manner to obtain the first capacitive touch profile comprises:
operating a first plurality of sensor electrodes of the first subset as transmitter electrodes, including driving the transmitter electrodes with sensing signals of two or more different frequencies;
operating a second plurality of sensor electrodes of the first subset as receiver electrodes, including obtaining resulting signals via the receiver electrodes corresponding to the sensing signals; and
obtaining the first capacitive touch profile based on the obtained resulting signals;
wherein the processor-executable instructions, when executed, facilitate the following being performed by the input device:
obtaining low ground mass (LGM) compensation-related information via a first receiver electrode in case that an input object disposed in the sensing region provides a bridging effect from a first transmitter electrode corresponding to a first frequency to the first receiver electrode, wherein a second transmitter electrode corresponding to a second frequency and a second receiver electrode are disposed between the first transmitter electrode and the first receiver electrode; and
performing LGM compensation on the first capacitive touch profile based on the obtained LGM compensation-related information.

15. The non-transitory computer-readable medium according to claim 14, wherein the first subset of the plurality of sensor electrodes corresponds to a first axis of the sensing region, and wherein the first capacitive touch profile is a one-dimensional capacitive touch profile corresponding to the first axis.

16. The non-transitory computer-readable medium according to claim 14, wherein the processor-executable instructions, when executed, further facilitate the following being performed by the input device:

operating a second subset of the plurality of sensor electrodes in a multi-frequency parallel transcapacitive sensing manner so as to obtain a second capacitive touch profile.

17. The non-transitory computer-readable medium according to claim 16, wherein the first subset of the plurality of sensor electrodes corresponds to a first axis of the sensing region, wherein the second subset of the plurality of sensor electrodes corresponds to a second axis of the sensing region, wherein the first capacitive touch profile is a one-dimensional capacitive touch profile corresponding to the first axis, and wherein the second capacitive touch profile is a one-dimensional capacitive touch profile corresponding to the second axis.

18. The non-transitory computer-readable medium according to claim 14, wherein the processor-executable instructions, when executed, further facilitate the following being performed by the input device:
   operating the plurality of sensor electrodes to obtain a two-dimensional capacitive image; and
   performing LGM compensation on the obtained two-dimensional capacitive image.

19. The non-transitory computer-readable medium according to claim 18, wherein performing LGM compensation on the obtained two-dimensional capacitive image utilizes the obtained LGM compensation-related information.

20. The non-transitory computer-readable medium according to claim 18, wherein performing LGM compensation on the obtained two-dimensional capacitive image utilizes previously stored LGM compensation-related information.

* * * * *